United States Patent

Enari

[11] Patent Number: 5,682,425
[45] Date of Patent: Oct. 28, 1997

[54] INFORMATION SIGNAL TRANSMISSION SYSTEM

[75] Inventor: Masahiko Enari, Yokohama, Japan

[73] Assignee: Canon Kabushiki Kaisha, Tokyo, Japan

[21] Appl. No.: 398,815

[22] Filed: Mar. 6, 1995

Related U.S. Application Data

[63] Continuation of Ser. No. 152,083, Nov. 12, 1993, which is a continuation of Ser. No. 685,849, Apr. 16, 1991, abandoned.

[30] Foreign Application Priority Data

Apr. 23, 1990 [JP] Japan ................................ 2-105258
Apr. 26, 1990 [JP] Japan ................................ 2-108903

[51] Int. Cl.[6] .............................. H04N 7/167; H04N 1/44; H04L 9/00
[52] U.S. Cl. ............................... 380/10; 380/20; 380/21; 380/29; 380/37; 380/18
[58] Field of Search ................................ 380/10, 20, 21, 380/29, 37, 48

[56] References Cited

U.S. PATENT DOCUMENTS

| | | | |
|---|---|---|---|
| 3,956,615 | 5/1976 | Anderson et al. | |
| 4,694,491 | 9/1987 | Horne et al. | 380/20 |
| 4,739,510 | 4/1988 | Jeffers et al. | 380/15 |
| 4,752,953 | 6/1988 | Paik et al. | 380/9 |
| 4,817,146 | 3/1989 | Szczutkowski et al. | 380/48 |
| 4,916,736 | 4/1990 | Ryan | 380/14 |
| 5,062,136 | 10/1991 | Gattis et al. | 380/18 |
| 5,398,283 | 3/1995 | Virga | 380/18 |

*Primary Examiner*—Stephen C. Buczinski
*Attorney, Agent, or Firm*—Robin, Blecker, Daley and Driscoll

[57] ABSTRACT

The information signal transmission system of the present invention is so designed as to convert the analog information signal into digital information data and to transmit these digital data after enciphering a part of the digital data. It can therefore maintain the secrecy of the transmitted information signal and can employ a low-speed enciphering process, thereby reducing the magnitude of hardware and reducing its cost.

31 Claims, 9 Drawing Sheets

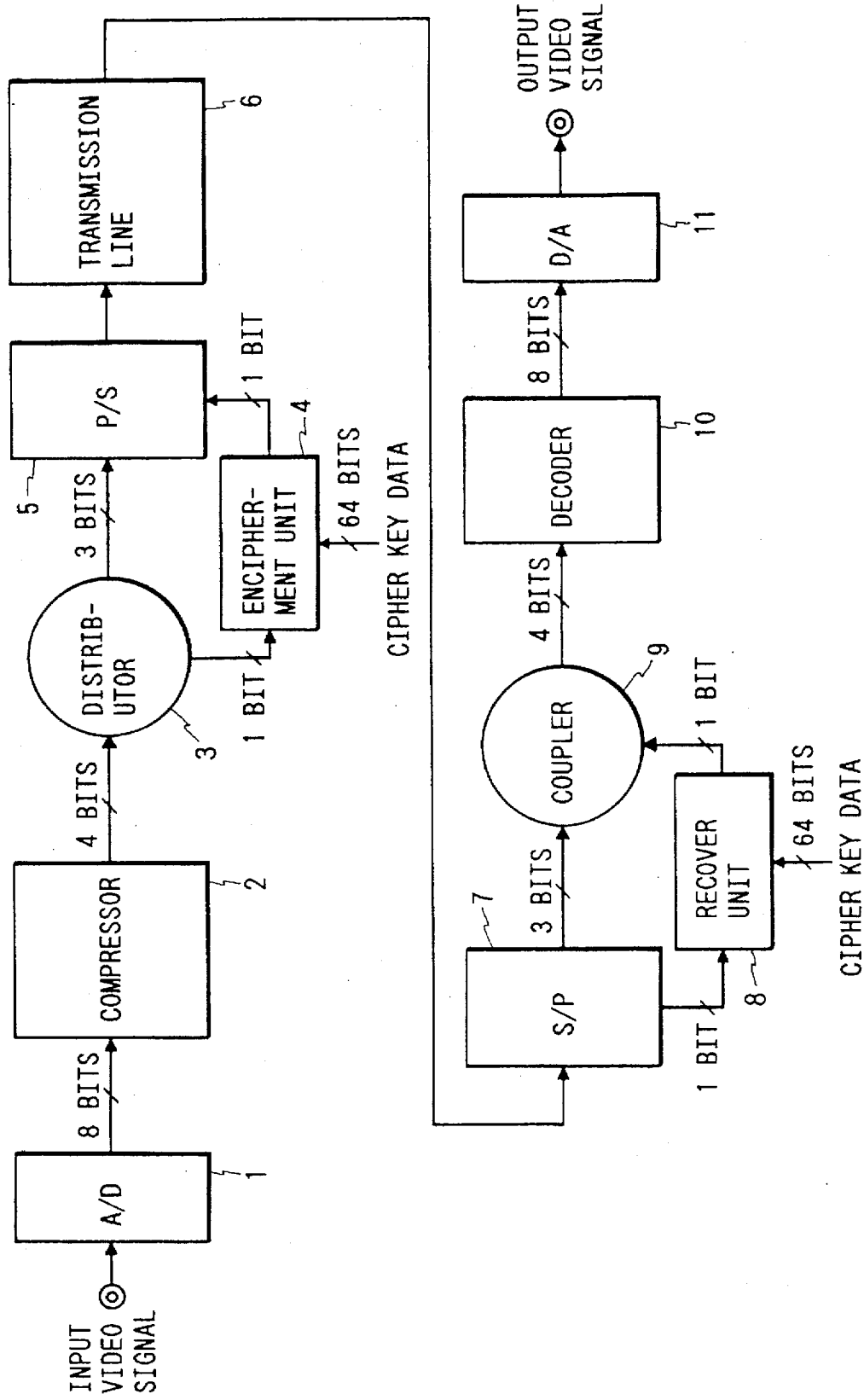

FIG. 13
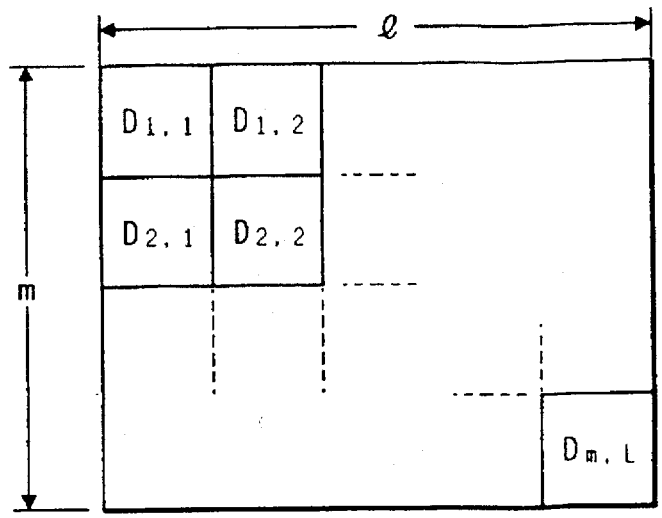
FIG. 14
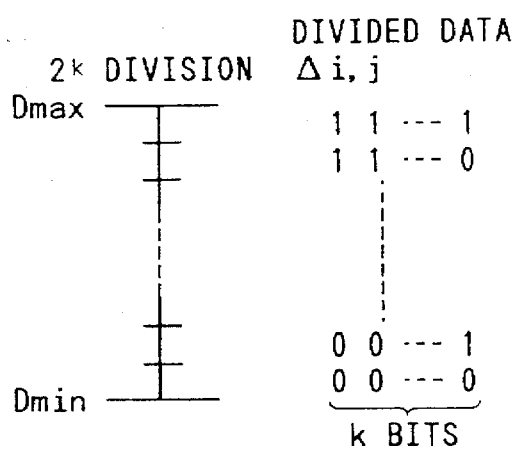
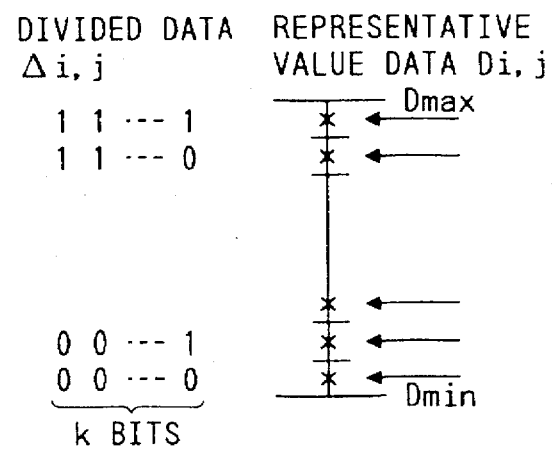

INFORMATION SIGNAL TRANSMISSION SYSTEM

This is a continuation application under 37 CFR 1.62 of prior application Ser. No. 08/152,083, filed Nov. 12, 1993, which is a continuation of Ser. No. 07/685,849, filed Apr. 16, 1991, abandoned.

BACKGROUND OF THE INVENTION

1. Field of the Invention

The present invention relates to a system for transmitting information signals.

2. Related Background Art

In recent years there have been significant progresses in the definition of images, as exemplified by the television image from the NTSC system to the high-vision system. In the recording of such high-definition image on a recording medium such as a tape or a disk, or in the transmission of such image to a distant location by a satellite, an optical fiber or a cable, digital transmission is superior to analog transmission in consideration of factors deteriorating the image quality such as the S/N ratio of signal, jitter generation, etc.

Such digital transmission provides an advantage in that the image quality deterioration is not generated in record/reproducing systems employing tape or disk even after repeated dubbings, but may lead to a major social issue, because it facilitates frequent illegal copyings or dubbings. Also in a charged communication in a communication or broadcasting system utilizing satellite, optical fiber or cable, there may result illegal reception of information by unauthorized persons.

For this reason, in the conventional digital signal transmission, particularly in the data transmission particularly for computers, there has been employed a method of applying predetermined ciphering to all the data to be transmitted, and deciphering the data at the receiving side with cipher key data corresponding to said predetermined ciphering.

In the following there will be explained conventional examples of such ciphering, with reference to FIGS. 1 and 2.

FIG. 1 is a flow chart of a ciphering method of the U.S. data encryption standard (hereinafter called DES) disclosed in the FIPS gazette 46 of Jan. 15, 1977, and FIG. 2 is a flow chart of a method for forming the ciphering function shown in FIG. 1.

Such conventional data ciphering algorithm shown in FIGS. 1 and 2 is already published as "Data Encryption Standard" as mentioned above.

This data encryption standard will be explained in more detail, with reference to FIGS. 1 and 2.

Said data encryption standard is a block cipher system for binary data consisting of "0" and "1". In this system, the ciphering is achieved by dividing the binary data into paired blocks of 32 bits each, and repeating transpositions and replacements to each block. The cipher key data have 64 bits, of which 56 bits are effective while the remaining 8 bits are error detection bits, and said key controls the replacement each time. FIG. 1 shows the process of ciphering in this system, and FIG. 2 shows a function fK(R) used as the core of ciphering.

Referring to FIG. 1, the binary data of 64 bits are at first subjected to a transposition, which is a predetermined process irrespective of the cipher key data. Then the binary data of 64 bits are divided into a left half $L_0$ and a right half $R_0$, which are then subjected to the following operations for 16 times:

$$L_n = R_{n-1}$$

$$R_n = L_{n-1} fK_n(R_{n-1}) \qquad (1)$$

wherein "+" indicates a sum of mod2 for each bit, while $L_n$ and $R_n$ are respectively the binary data of 32 bits of the left half and those of the right half after an n-th operation.

$K_n$ is formed from the cipher key data, as shown in the right half of FIG. 1, wherein $s_1, \ldots, s_{16}$ are "1" or "2". The contractive transposition consists of a transposition with certain input bits excluded. For example 8 bits are excluded from the input 56 bits, so that the output becomes 48 bits. Said contractive transposition is an irreversible conversion, in which the input cannot be completely restored from the output, so that the estimation of the cipher key data is rendered more difficult.

The function $fK_n(R_n)$ shown in FIG. 1 will be explained further in the following, with reference to FIG. 2.

For forming the function $fK_n(R_n)$, at first $R_n$ (binary data of 32 bits of the right half) are subjected to an expansive transposition, which is a transposition with certain input bits overlapped. In this case, 16 bits out of the 32 input bits appear in overlapping manner in the output. Then $K_n$, formed from the cipher key data, is added to said output, bit by bit in mod2. The output of 48 bits thus obtained is divided into 8 small blocks of 6 bits each, and each 6 bits are converted into 4 bits by $S_1, S_2, \ldots, S_8$. This operation can be regarded as a kind of replacement, taking 6 bits as a character, but this conversion is irreversible because the output is compressed to 4 bits. Consequently the function $fK_n(R_n)$ is generally an irreversible function, but this does not mean that the conversions of equations (1) are irreversible. In fact said equations (1) can be transformed as:

$$\left. \begin{array}{l} R_{n-1} = L_n \\ L_{n-1} = R_n + fK_n(R_{n-1}) = R_n + fK_n(L_n) \end{array} \right\} \qquad (2)$$

so that $L_{n-1}$, $R_{n-1}$ can be calculated from $L_n$, $R_n$.

$L_{16}$ and $R_{16}$, obtained by repeating the operation of the equations (1) 16 times, are finally subjected to a transposition to complete the ciphering.

The deciphering is conducted by a process substantially inverse to the ciphering process, namely a process proceeding from bottom to top in FIG. 1. At first there is conducted a transposition inverse to the final transposition in ciphering process. Then $R_{n-1}$, $L_{n-1}$ are determined according to the equations (2), and $R_0$, $L_0$ obtained in this manner are subjected to a transposition inverse to the initial transposition in the ciphering process to obtain the initial 64 bits.

The only way so far known for breaking the data enciphered by this system is to investigate the cipher key data one by one. If a key requires 1 microsecond for investigation, the entire key of $2^{56}$ combinations requires 2283 years, or at least several hundred years with good luck, so that this system is practically unbreakable.

In case of digital transmission of high-definition television signal, such as the high-vision signal, with ciphering, if the analog image signal is simply A/D converted for transmission, the sampling rate has to be at least 60 MHz, according to the sampling theory, in order to secure an image signal bandwidth for example 30 MHz for preventing deterioration in image quality. For a sampling frequency of 74.25 MHz and an A/D conversion of 8-bit digitization per sample, the signal transfer rate becomes 74.25 (MHz)×8 (bit)=594 Mbit/s. Even if the data are compressed to ⅕ for reducing the amount of transmitted information, the transfer rate becomes as high as about 120 Mbit/s. The enciphering of such enormous amount of information requires a high-speed process in the ciphering circuit, and is extremely difficult in the magnitude of hardware and in the increased cost.

SUMMARY OF THE INVENTION

An object of the present invention is to provide an information signal transmission system capable of resolving the drawbacks mentioned above.

Another object of the present invention is to provide an information signal transmission system capable of maintaining the secrecy of information in the transmission of information signals.

In one aspect of the present invention, the foregoing objects can be attained by an information signal transmission system comprising:
  conversion means for converting analog information signal into digital information data;
  cipher means for enciphering a part of the digital information data released from said conversion means; and
  transmission means for transmitting the digital information data of which a part is enciphered by said cipher means.

Still another object of the present invention is to provide an information signal transmission system capable of reducing the speed of enciphering processing, thereby rendering the hardware compact and reducing the cost.

In another aspect of the present invention, the foregoing object can be attained by an information signal transmission system comprising:
  conversion means for converting an analog information signal into digital information data;
  data compression means for applying a data compression process to the digital information data released from said conversion means, thereby forming compressed data;
  cipher means for enciphering a part of the compressed data released from said data compression means; and
  transmission means for transmitting the compressed data, of which a part is enciphered by said cipher means.

The foregoing and still other objects of the present invention, and the features thereof, will become fully apparent from the following detailed description of embodiments thereof, which is to be taken in conjunction with the attached drawings.

BRIEF DESCRIPTION OF THE DRAWINGS

FIG. 3 is a block diagram of an information signal transmission system constituting a first embodiment of the present invention;

FIG. 13 is a view of each of the sample blocks shown in FIG. 12;

FIG. 14 is a view showing functions of the compressor and the decoder in the information signal transmission system of the third embodiment, wherein (a) shows the state of digitization in a division value converting circuit in the compressor shown in FIG. 9, while (b) indicates the state of decoding in the decoder;

DETAILED DESCRIPTION OF THE PREFERRED EMBODIMENTS

Figure 1:
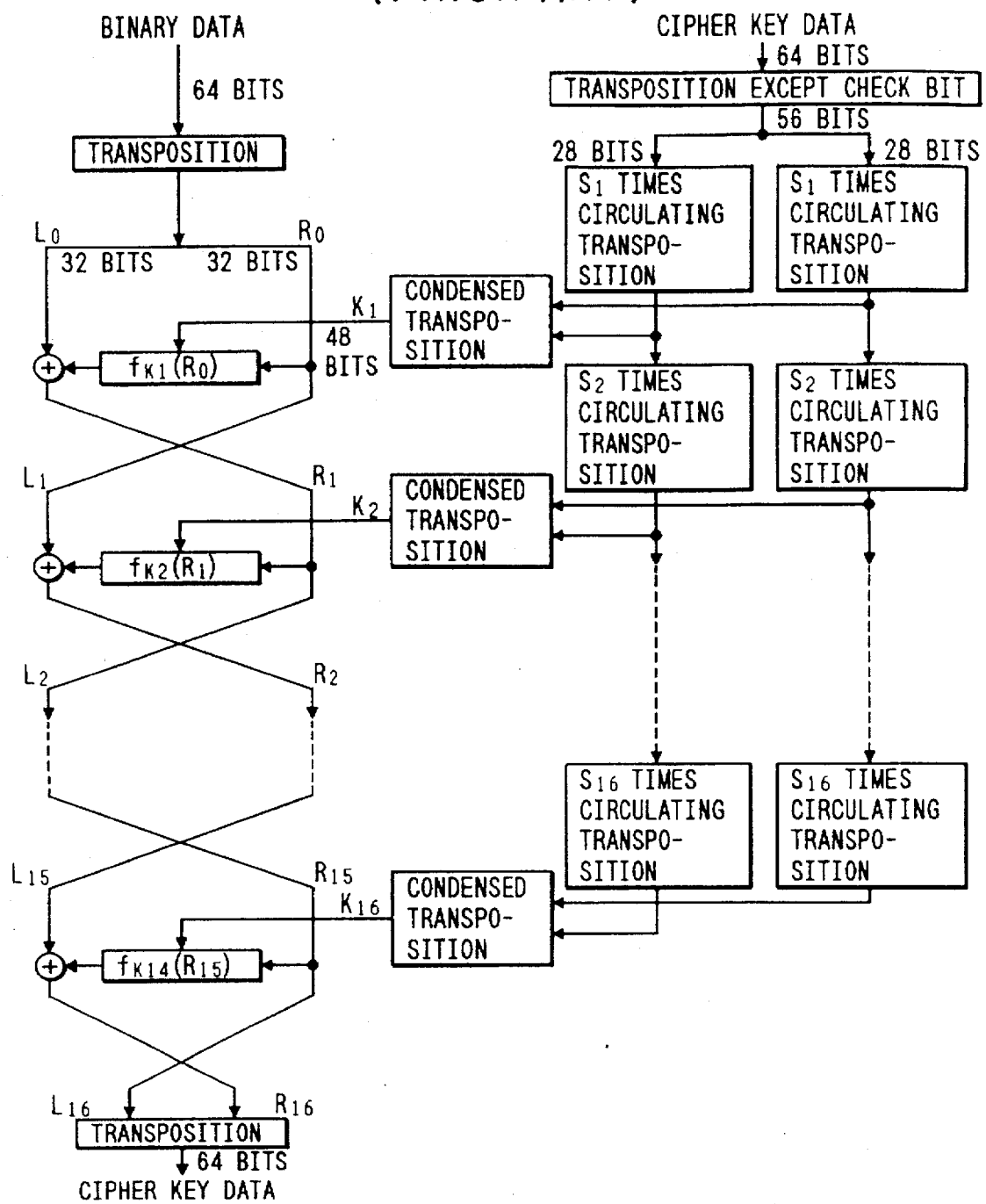
FIG. 1 is a flow chart of a conventional ciphering process.
Figure 2:
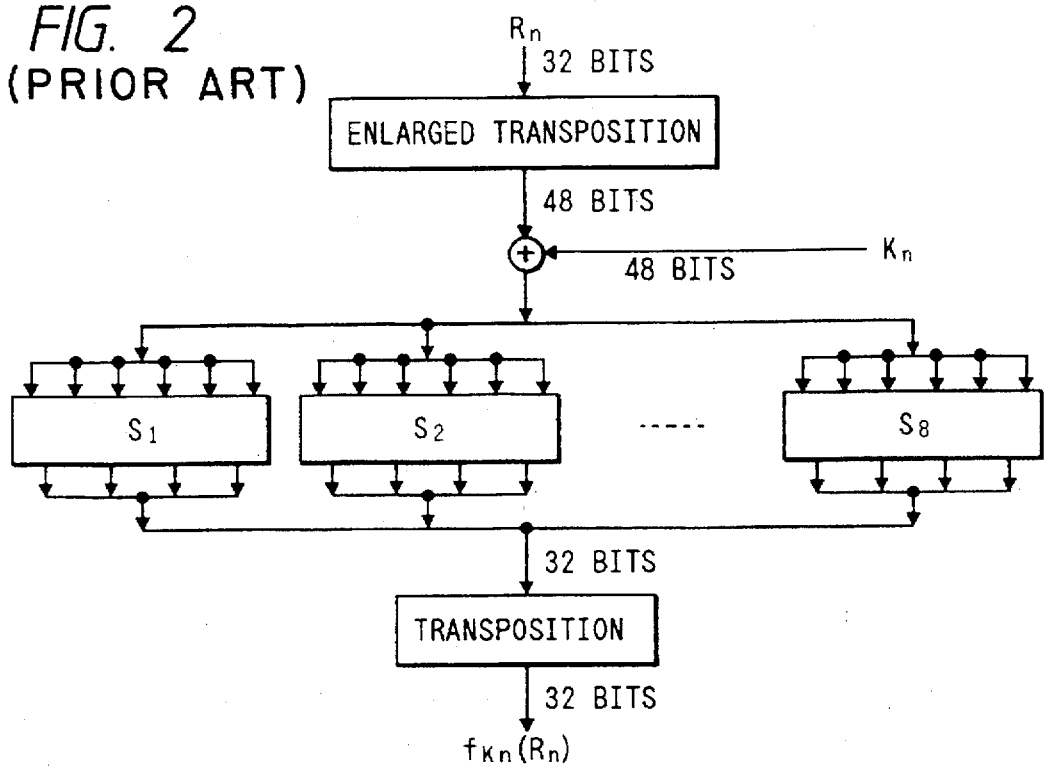
FIG. 2 is a flow chart showing a method for forming a function to be employed in the enciphering. process shown in FIG. 1.

Now the present invention will be clarified in detail by preferred embodiments thereof.

FIG. 3 is a block diagram of an information signal transmission system constituting a first embodiment of the present invention.

Said system is so constructed as to compress 8-bit data, corresponding to a sample, to 4-bit data, and to transmit said compressed data after enciphering of the MSB (most significant bit) only.

In FIG. 3, there are shown an A/D converter 1 for converting an analog video signal into a digital video signal of 8 bits per sample; a transmission channel 6 such as an optical fiber or a cable, or a recording system such as a tape or a disk; an enciphering unit 4 for enciphering only the 1-bit data of the MSB of 4-bit data released from a compressor 2 to be explained later, according to 64-bit cipher key data confidentially determined in advance between the transmitter and the receiver; a compressor 2 for compressing 8-bit digital video signal into 4-bit data; a distributor 3 for separating the 4-bit data released from the compressor 2 into the 1-bit data of the MSB and the remaining 3-bit data; a parallel-serial converter 5 for receiving the 1-bit MSB data enciphered by said enciphering unit 4 and the other unciphered 3bit data in parallel manner and serially releasing these data to the receiving side through the transmission channel 6; a serial-parallel converter 7 for separating the data, transmitted through said transmission channel 6, into the 1-bit data of the MSB and the other 3-bit data; a deciphering unit 8 for deciphering said enciphered MSB data according to the 64-bit cipher key data determined, as explained above, in advance between the transmitter and the receiver; a coupler 9 for coupling the 1-bit MSB data deciphered by said deciphering unit 8 and the other 3-bit data released from the serial-parallel converter 7 to release 4-bit data; a decoder 10 for expanding the 4-bit data, released from said coupler 9, to 8-bit data; and a D/A converter 11 for converting the 8-bit data, released from said decoder 10, into an analog video signal.

In the following there will be explained the function of the present first embodiment.

At first explained is the data compressing operation. For compressed transmission of data obtained by digitizing a signal with a large amount of information, such as an image signal, there is already known a DPCM (differential pulse code modulation) method. This method achieves data compression by predicting the value of a sample point currently subjected to encoding, from the value of an already encoded sample point, and encoding the difference (prediction error) between said predicted value and the true value, and is capable of a highly efficient encoding in a signal having a high correlation between the values of mutually close sample points, such as an image signal, by effecting a non-linear digitization in consideration for example of the deviation in the distribution of predicted errors.

Figure 4:
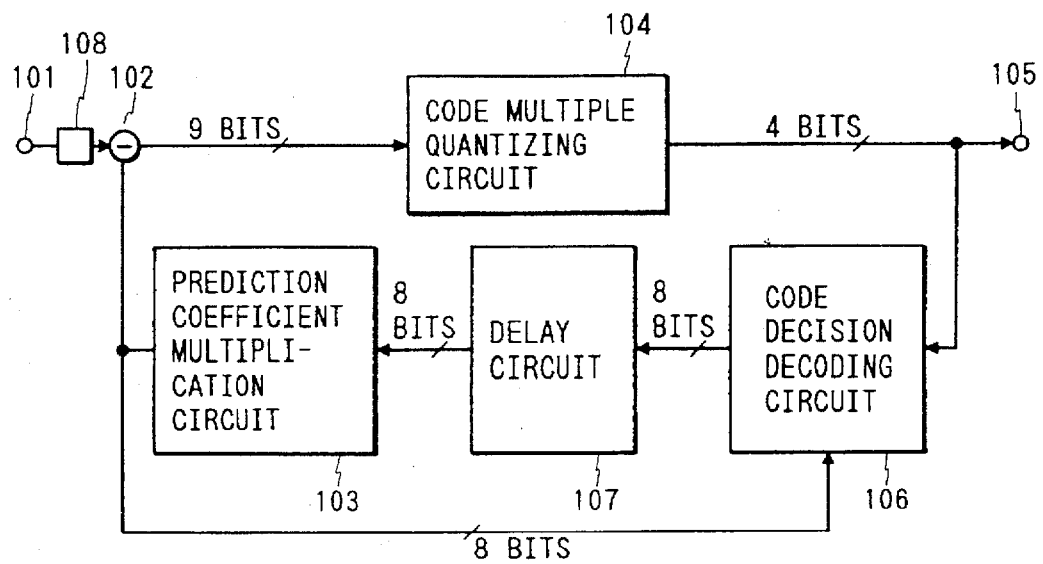
FIG. 4 is a block diagram of a compressor in the information signal transmission system shown in FIG. 3.
Figure 5:
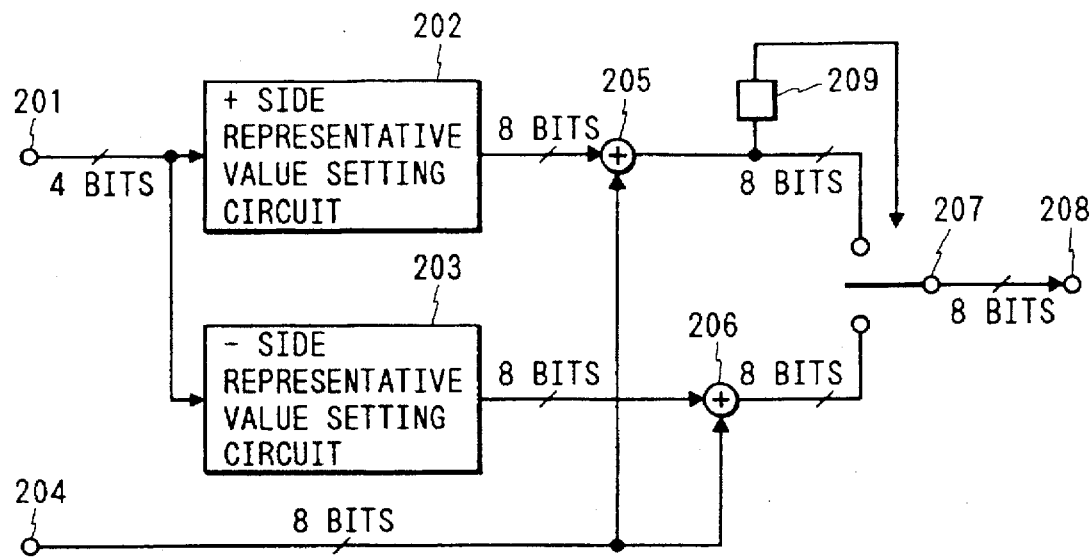
FIG. 5 is a block diagram of a sign determining decoding circuit in the compressor shown in FIG. 4.
Figure 6:
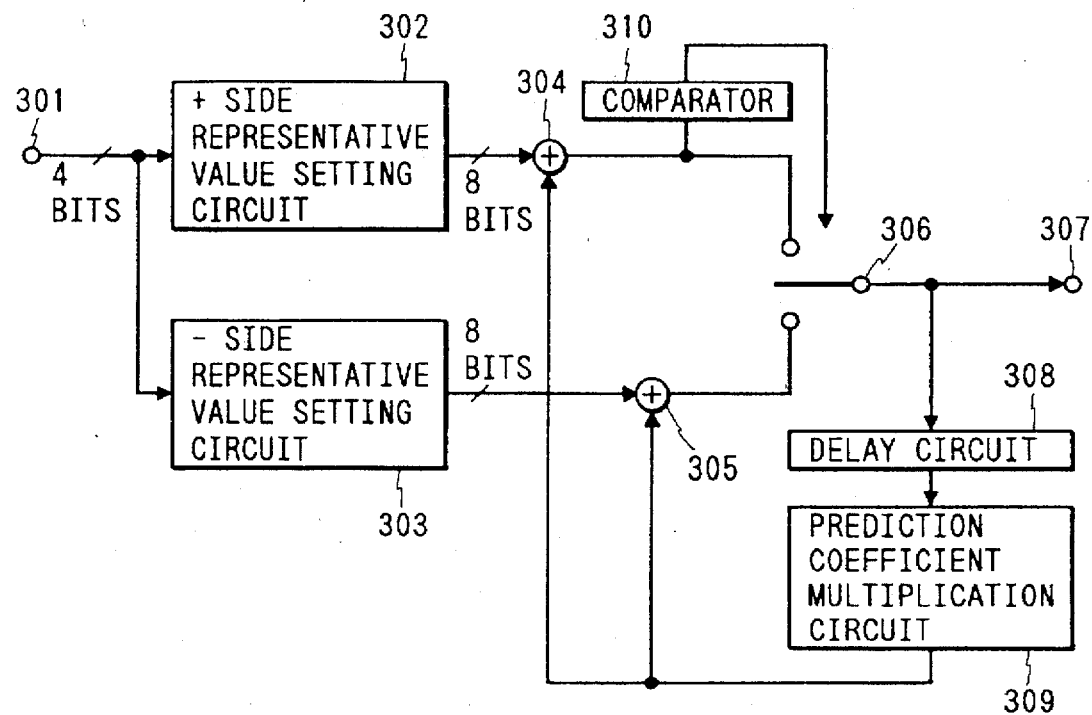
FIG. 6 is a block diagram of a decoder in the information signal transmission system shown in FIG. 3.

FIG. 4 is a block diagram showing the structure of the compressor 2 shown in FIG. 1, for compressing 8-bit data into 4-bit data, and FIG. 5 is a block diagram showing the structure of a sign determining decoding circuit in said compressor 2. FIG. 6 is a block diagram showing the structure of the decoder 10 shown in FIG. 1.

Referring to FIG. 4, the digital video signal is supplied, in a unit of 8 bits, to an input terminal 101, then is limited within a certain range, for example within a range of digital levels of "16" to "235", by a limiter 108, and is subjected, in a subtraction circuit 102, to the calculation of difference (prediction error) from the predicted value released from a prediction coefficient multiplying circuit 103. Said predicted error data are supplied to a sign multiplexing digitizing circuit 104, which digitizes the predicted error data of 9 bits including a plus/minus sign into 4-bit data, based on digitizing characteristics in which a same value is assigned to positive and negative data as shown in Table 1. The obtained 4-bit digital data are released from an output terminal 105 and also supplied to the sign determining decoding circuit 106.

TABLE 1

| Digitized value | + side representative value | − side | representative value |
|---|---|---|---|
| 0 | 0 | | 0 |
| 1 | 1–4 | 1 | −219 | −219 |
| 2 | 5–10 | 5 | −218—−215 | −215 |
| 3 | 11–20 | 11 | −214—−209 | −209 |
| 4 | 21–35 | 21 | −208—−199 | −199 |
| 5 | 36–55 | 36 | −198—−184 | −184 |
| 6 | 56–79 | 56 | −183—−164 | −164 |
| 7 | 80–109 | 80 | −163—−140 | −140 |
| 8 | 110–139 | 110 | −139—−110 | −110 |
| 9 | 140–163 | 140 | −109—−80 | −80 |
| 10 | 164–183 | 164 | −79—−56 | −56 |
| 11 | 184–198 | 184 | −55—−36 | −36 |
| 12 | 199–208 | 199 | −35—−21 | −21 |
| 13 | 209–214 | 209 | −20—−11 | −11 |
| 14 | 215–218 | 215 | −10—−5 | −5 |
| 15 | 219 | 219 | −4—−1 | −1 |

The digitizing characteristics shown in Table 1 are an example of the table for determining the positive or negative sign for predicted error data in a range from −219 to 219, utilizing the decoded values of already digitized data, thereby selecting a representative value, and is capable of achieving digitization with digitized levels corresponding to 5 bits by assigning a digitized level of 4 bits to each of two digitizing steps in the positive and negative sides.

Also Table 1 is so designed that two digitizing steps of the positive and negative sides, corresponding to a same digitized value, always have a level difference corresponding to the limited dynamic range (for example "220") of the decoded data, and is also designed as an undershoot type in which the representative value is taken at the lower end of each digitizing step. Consequently the results of decoding with the positive and negative representative values always have a level difference of "220", and only one of said results is contained in the dynamic range from "0" to "219". This fact enables one to discriminate the sign of the difference value as will be explained later. In case of an image signal, the difference values in the vicinity of "0" are particularly important, and, there is employed a symmetrical structure with respect to the center at the positive and negative sides, in order to enable superposition of the non-linear characteristics.

The sign determining decoding circuit 106 decodes the data released from said sign multiplex digitizing circuit 104, utilizing the predicted data released from the prediction coefficient multiplying circuit 103, and sends the decoded data to a delay circuit 107. Then, after a delay for a predetermined period (for example a sampling period) therein, the decoded data are subjected to multiplication by a prediction coefficient in the multiplying circuit 103, and are supplied, as the predicted data, to said subtracting circuit 102 and said sign determining decoding circuit 106.

In the following there will be explained the function of the sign determining decoding circuit 106 shown in FIG. 4, with reference to FIG. 5. Referring to FIG. 5, the 4-bit data from the sign multiplex digitizing circuit 104 shown in FIG. 4 are entered into a terminal 201, and supplied to a plus-side representative value setting circuit 202 and a minus-side representative value setting circuit 203. The positive and negative representative values released from said setting circuits 202, 203 are respectively added, in adding circuits 205, 206, to the predicted data supplied from the prediction coefficient multiplying circuit 103, shown in FIG. 4, through a terminal 204, and supplied as positive and negative decoded data to a selecting circuit 207. Since the outputs from the plus-side representative value setting circuit 202 and the minus-side representative value setting circuit 203 always have a mutual level difference of "220", either one of the positive and negative decoded data supplied to the selecting circuit 207 is always outside the limited dynamic range from "16" to "235" within the 8-bit range ("0"–"255"). Thus correct decoded data can be obtained from the sign multiplexed input data, by selecting either one of the positive and negative decoded data, present in said dynamic range. For this purpose, the level of the decoded data obtained from the adding circuit 205 of the plus side is compared in a comparator 209 with a threshold value "236", and the selecting circuit 207 is controlled by the output of said comparator 209 to select either one of the positive and negative decoded data, for release through a terminal 208.

In the following the sign determining operation in the present embodiment will be explained by specific examples. Let us assume a case in which the predicted data are "100" and the input data are "150". Since the prediction error is "+50" in this case, the sign multiplex digitizing circuit 104 generates "5" as the 4-bit digitized data according to Table 1. The sign determining decoding circuit 106 generates plus-side decoded data "136" and minus-side decoded data "−84", and the former is selected as the decoded data because it is within the appropriate dynamic range from "16" to "235". Also in case the input data are "50" and the prediction error is "−50", the sign multiplex digitizing circuit 104 generates "11". In this case the plus-side decoded data are "284" while the minus-side decoded data are "64", and the latter is selected in said dynamic range.

In the following there will be explained, with reference to FIG. 6, the decoder 10 for decoding the data compressed by the compressor 2 and transmitted through the transmission channel 6 shown in FIG. 3.

Referring to FIG. 6, the data transmitted through said channel 6 are entered, by every 4 bits, into an input terminal 301, and supplied to a plus-side representative value setting circuit 302 and a minus-side representative value setting circuit 303. The positive and negative representative values respectively released from said setting circuits 302, 303 are added, respectively in adding circuits 304, 305, to the predicted data supplied from a prediction coefficient multiplying circuit 309, and supplied as positive and negative decoded data to a selecting circuit 306. Since the outputs from said setting circuits 302, 303 always have a mutual level difference of "220" because of the digitizing characteristics shown in Table 1, either one of the positive and negative decoded data supplied to said selecting circuit 306 is always outside the limited dynamic range "16"–"235". Thus correct decoded data, corresponding to the input data, can be obtained by selecting the one within said dynamic range. For this purpose the decoded data released from the plus-side adding circuit 304 is compared in a comparator 310 with a threshold value "236", and the selecting circuit 306 is controlled by the output of said comparator 310 to select either of the positive and negative decoded data, for release as 8-bit decoded data from an output terminal 307. Said decoded data are subjected to a delay of a sampling period in a delay circuit 308, and are then supplied to the prediction coefficient multiplying circuit 309, which calculates the predicted data by multiplying the decoded data, delayed by a sampling period, with the prediction coefficient, and sends said decoded data to the adding circuits 304, 305 for the decoding of the succeeding 4-bit input data. The decoding of the transmitted data is conducted by the above-explained structure.

As will be apparent from Table 1, the transmitted 4-bit data are a code giving the representative value of the difference of the image data. Thus the decoding of the original image data is entirely impossible if even a bit, among said 4-bit data, is unknown.

Thus the present embodiment is designed to maintain the secrecy of image transmission, by enciphering only one bit of said compressed 4-bit data for example by DES method.

In the present embodiment, the enciphering is conducted only on the MSB of the transmitted data in compressed transmission of image data by the DPCM process, but it is also possible to encipher one of bits other than the MSB of the transmitted data. Also instead of enciphering on all the transmitted data corresponding to all the sample values of the image signal as explained in the present embodiment, the enciphering may be conducted on a bit or plural bits of transmitted data of every several sample points. Also the data compression method is not limited to DPCM, and, if the data are transmitted without compression, the enciphering may be applied only to the MSB of such transmitted data. Also the present embodiment has been limited to the transmission of an image signal, but the present invention is likewise applicable to other information signals, such as an acoustic signal.

As explained in the foregoing, the enciphering of only a part of the information to be transmitted allows one to maintain secrecy in the transmission of information signal and to use a low-speed process in the enciphering, thereby reducing the magnitude of the hardware and also reducing the cost thereof.

In the following there will be explained a second embodiment of the present invention.

Figure 7:
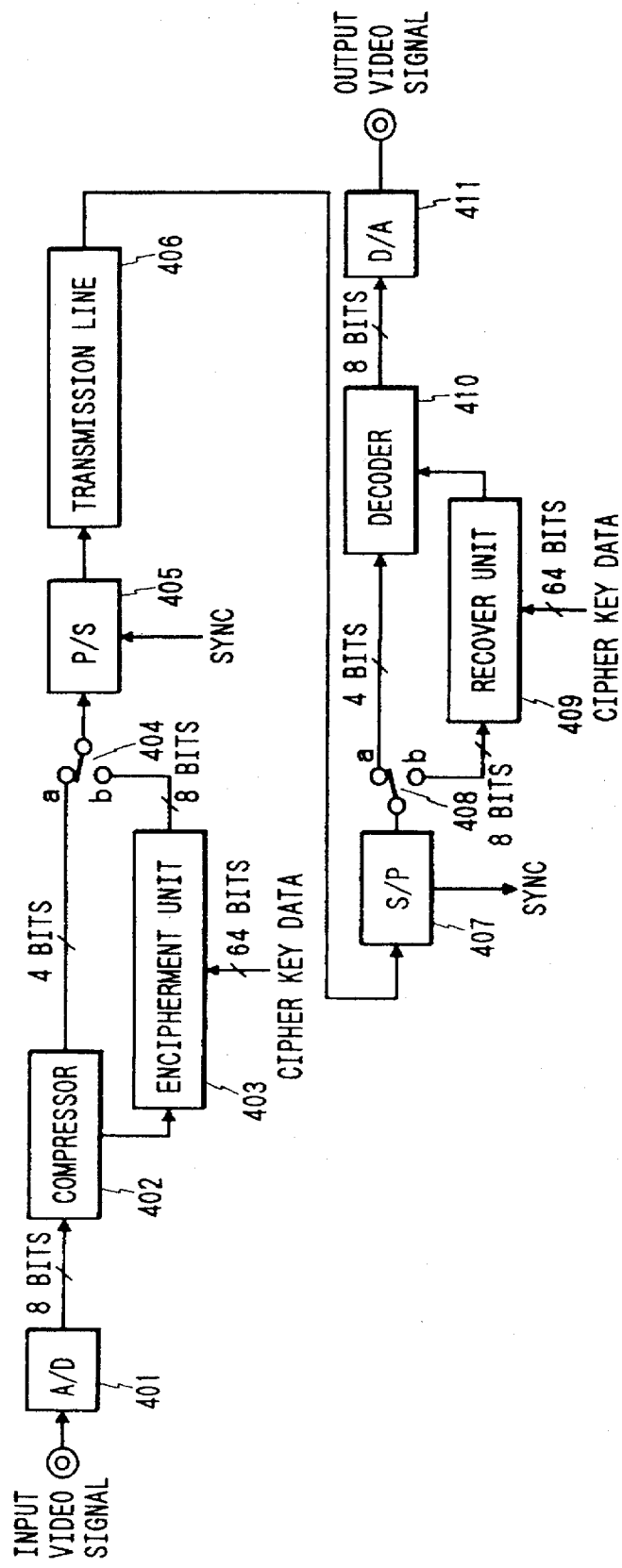
FIG. 7 is a block diagram of an information signal transmission system constituting a second embodiment of the present invention.

FIG. 7 is a block diagram of an information signal transmission system constituting a second embodiment of the present invention.

The system shown in FIG. 7 is so designed to at first encipher and transmit 8-bit initial value data corresponding to a sample as an initial value, and then to transmit, in succession, 4-bit data corresponding to N samples (N being a positive integer), compressed according to said initial value data.

At first an explanation will be given on the transmitting side.

Referring to FIG. 7, there are shown an A/D converter 401 for converting an analog video signal into a digital video signal of 8 bits per sample; a compressor 402 for compressing the 8-bit digital video signal into 4-bit data; and an enciphering unit 403 for enciphering only initial value data to be explained later, based on 64-bit cipher key data confidentially determined in advance between the transmitter and the receiver.

Figure 8:
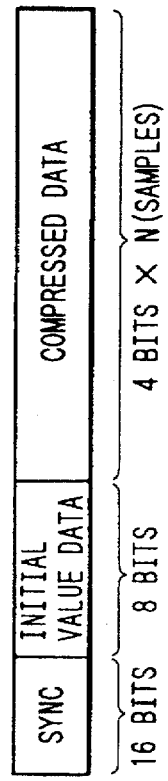
FIG. 8 is a view showing the format of transmitted data in the information signal transmission system shown in FIG. 7.

There are also shown a switch 404 for selecting either the initial value data (terminal b) enciphered according to a transmission format shown in FIG. 8 or the compressed data (terminal a); and a parallel-serial converter 405 for receiving said enciphered initial value data, compressed data and synchronization data (SYNC in FIG. 7) in parallel manner and serially releasing these data, for transmission to the receiving side through a transmission channel 406. Said channel 406 can be a recording system such as a tape or a disk, or a communication or broadcasting system such as a satellite, an optical fiber or a cable.

In the receiving side, there are provided a serial-parallel converter 407 for converting the received data into parallel data; a switch 408 for separating the enciphered initial value data (terminal b) and the compressed data (terminal a) by detecting the synchronization data SYNC according to the transmission data format shown in FIG. 8; a decoder 409 for deciphering the enciphered initial value data; a decoder 410 for expanding the 4-bit compressed data to an 8-bit digital video signal according to the initial value data deciphered by the decipher unit 409; and a D/A converter 411 for converting the 8-bit digital video signal into an analog video signal.

Figure 9:
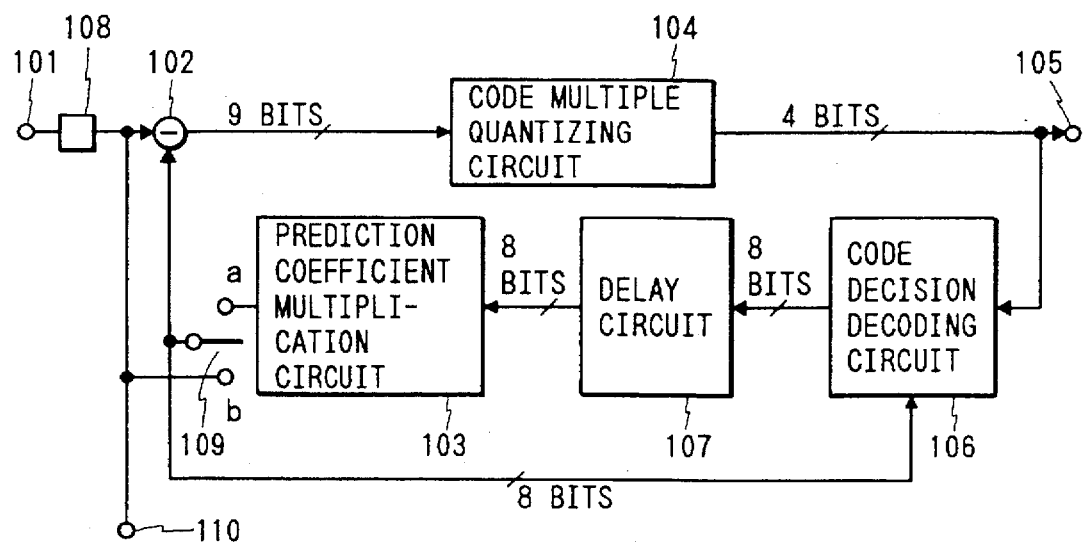
FIG. 9 is a block diagram, showing a compressor in the information signal transmission system shown in FIG. 7.

FIG. 9 is a block diagram showing an example of the compressor 402 shown in FIG. 7, wherein same components as those in the compressor 2 in the first embodiment (FIG. 4) are represented by same numbers, and will not be explained further.

Referring to FIG. 9, the input data limited to a predetermined dynamic range by the limiter 108 are supplied, through the output terminal 110, to the enciphering unit 403 shown in FIG. 7, and also to the terminal b of the switch 109.

The terminal a of said switch 109 receives the predicted data released from the prediction coefficient multiplying circuit 103.

The circuit shown in FIG. 9 constitutes a DPCM circuit for compressing a digital video signal of 8 bits corresponding to each sample, into 4-bit data.

In the compression and transmission of information data by the DPCM process, an error generated in a part of data on the transmission channel propagates to the subsequently transmitted data, whereby the restoration of the original data at the receiving side becomes impossible.

Consequently, in the use of the DPCM process, the uncompressed original data are transmitted as initial value data at a predetermined interval, thereby minimizing the propagation of the data error.

In the compressor shown in FIG. 9, the switch 109 is connected to the terminal b for a sample period in every one or several scanning periods, but is connected to the terminal a in other periods, whereby the subtractor 103 is given the data from the limiter 108 instead of the predicted data from the prediction coefficient multiplying circuit 103 in every one or several scanning line periods to repeat the initial setting of the compressor. Also the switch 404 shown in FIG. 7 is shifted between the terminals a and b in linkage with said switch 109 in FIG. 9, whereby the 8-bit data released from the limiter 108 during the initial setting of the compressor are enciphered as initial value data in the enciphering unit 403 and released through said switch 404, while the compressed data are released through said switch 404 in other periods.

Figure 10:
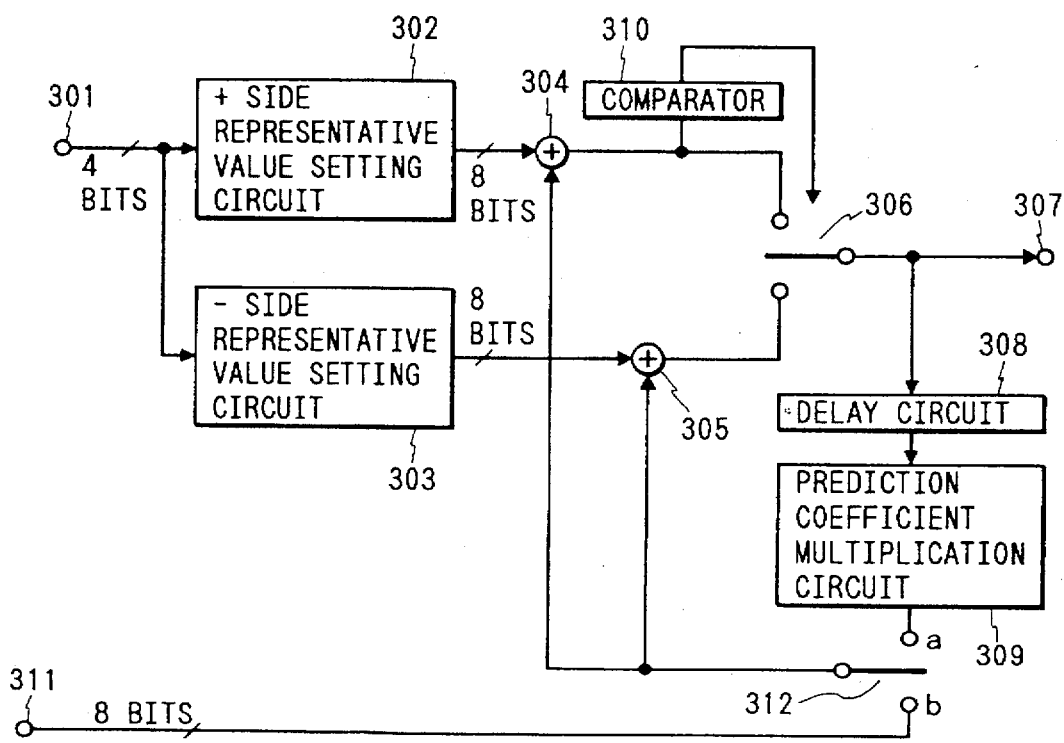
FIG. 10 is a block diagram, showing a decoder in the information signal transmission system shown in FIG. 7.

FIG. 10 is a block diagram showing an example of the decoder 410 shown in FIG. 7, corresponding to the compressor shown in FIG. 9.

In FIG. 10, same components as those in the decoder 10 in the first embodiment (cf. FIG. 6) are represented by same numbers, and will not be explained further.

Referring to FIG. 10, the initial value data deciphered in the deciphering unit 409 in FIG. 7 according to the cipher key data are supplied, through an input terminal 311, to the terminal b of the switch 312.

The terminal a of said switch 312 receives the predicted data released from the prediction coefficient multiplying circuit 309.

Said switch 312 is shifted in linkage with the switch 408 shown in FIG. 7, wherein, while the switch 408 is connected to the terminal b, the adders 304, 305 are given the initial value data deciphered in the deciphering unit 409 according to the cipher key data, instead of the predicted data released from the prediction coefficient multiplying circuit 309, thereby achieving the initial setting of the decoder, whereas in other periods the compressed data supplied in the unit of 4 bits are expanded to 8-bit data in the decoder thus initialized by the initial value data.

As explained in the foregoing, in the compressed transmission of video signal by the DPCM process which digitizes the difference between the values of mutually close sample points on the image frame, the restoration of the values of sample points succeeding to the initial sample point becomes utterly impossible if the initial value data corresponding to said initial sample point are unknown. In case the information signal to be transmitted is a video signal, it is necessary to transmit the initial value data in every one or several scanning line periods as explained above, and the secrecy of image transmission can be maintained by enciphering said initial value data only, by means of the cipher key data.

In the following there will be explained a third embodiment of the present invention.

Said third embodiment employs block encoded transmission for the compressed transmission of image signal, and enciphers the initial value data only, among the data transmitted by said block encoded transmission method, by means of cipher key data.

Said block encoded transmission method consists of dividing all the sample points constituting an image frame into sample block groups, each composed of plural sample points, transmitting a pair of data relating to the maximum and minimum values of all the sample data in each sample block as the initial value data, and also transmitting the compressed data digitized based on said paired sample data.

Figure 11:
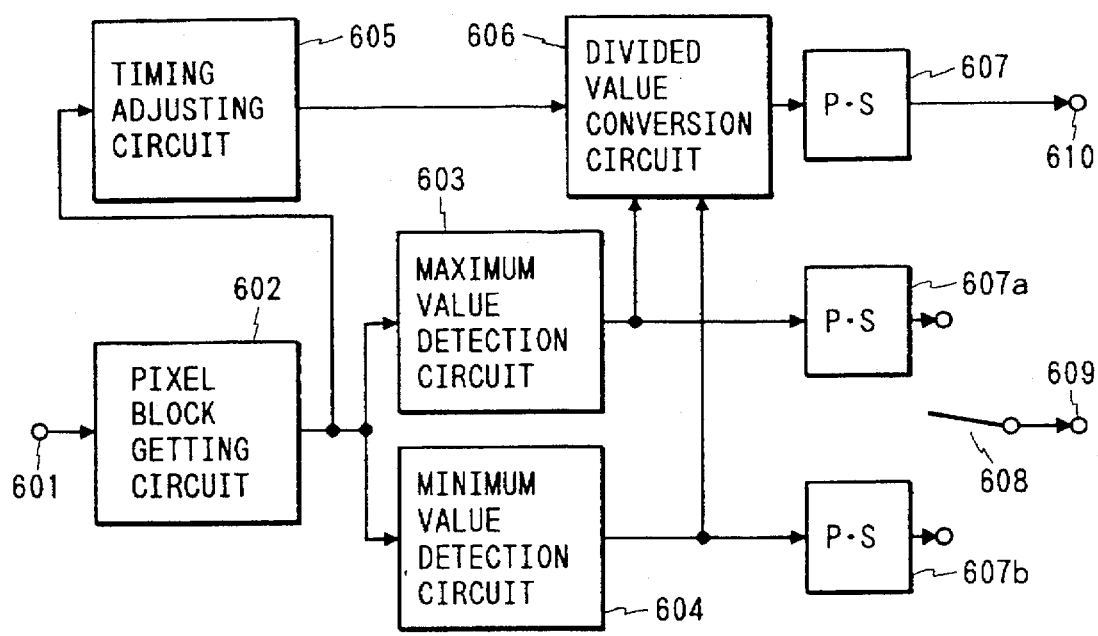
FIG. 11 is a block diagram, as a third embodiment of the present invention, showing substitute a compressor for use in the information signal transmission system shown in FIG. 7.
Figure 12:
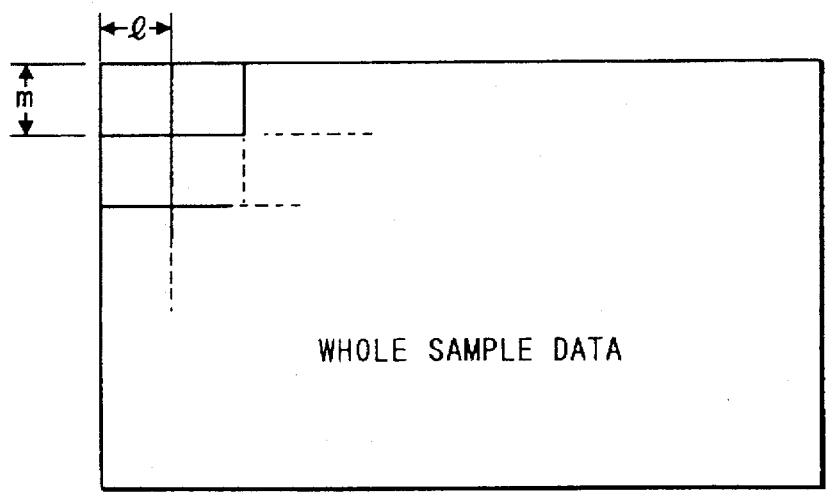
FIG. 12 is a view of all sample data of an image frame divided into plural sample blocks, in the information signal transmission system of the third embodiment.

FIG. 11 is a block diagram of a compressor, constituting the third embodiment and employed in the information signal transmission system shown in FIG. 7. A terminal 601 receives an n-bit digital image signal, obtained by sampling with a predetermined frequency and digitizing, in the A/D converter 401 in FIG. 7, a raster-scan analog image signal such as a television signal. Said digital image signal with $2^n$ levels is supplied to a sample block cutout circuit 602. FIG. 12 illustrates the division of all the sample data into sample blocks. Said circuit 602 forms a block of l×m sample points, namely l sample points in the horizontal (H) direction and m sample points in the vertical (V) direction as shown in FIG. 12. The data output is conducted for each sample block thus formed.

FIG. 13 illustrates a sample block, containing sample data $D_{1,1} \sim D_{m,l}$. The digital image data from the sample block cutout circuit 602 are supplied to a maximum value detecting circuit 603, a minimum value detecting circuit 604, and a timing adjustment circuit 605. Thus, among all the sample data $D_{1,1} \sim D_{m,l}$ in each sample block, the maximum value $D_{max}$ and the minimum value $D_{min}$ are respectively detected by the maximum value detecting circuit 603 and the minimum value detecting circuit 604.

On the other hand, the timing adjustment circuit 605 delays all the sample data by a time required for the detection of $D_{max}$ and $D_{min}$ in said detecting circuits 603, 604, and sends all the sample data of each sample block to a divided value converting circuit 606, in a predetermined order, for example $D_{1,1}, D_{2,1}, D_{3,1}, \ldots, D_{m,1}, D_{1,2}, \ldots, D_{m,2}, \ldots, D_{1,(l-1)} \ldots, D_{m,(l-1)} D_{1,l}, \ldots, D_{m,l}$.

In this manner all the sample data $(D_{1,1} \sim D_{m,l})$ in each sample block and the maximum value $D_{max}$ and the minimum value $D_{min}$ thereof are supplied to the divided value converting circuit 606, and division data $(\Delta_{1,1} \sim \Delta_{l,m})$ of k bits can be obtained by comparison of said sample data with digitizing levels obtained by dividing the interval between $D_{max}$ and $D_{min}$ into $2^k$ levels, wherein k is an integer smaller than n. This digitizing operation is illustrated in FIG. 14A.

As shown in FIG. 14A, $\Delta_{i,j}$ is obtained as k-bit binary data. The k-bit division data $\Delta_{i,j}$ and $D_{max}$, $D_{min}$ of n bits thus obtained are converted into serial data respectively by parallel-serial converters 607, 607a, 607b, and $D_{max}$, $D_{min}$ are supplied through a data selector 608 and an output terminal 609 to the enciphering unit 403 shown in FIG. 7, while the division data $\Delta_{i,j}$ are supplied, through an output terminal 610, to the terminal a of the switch 404.

Figure 15:
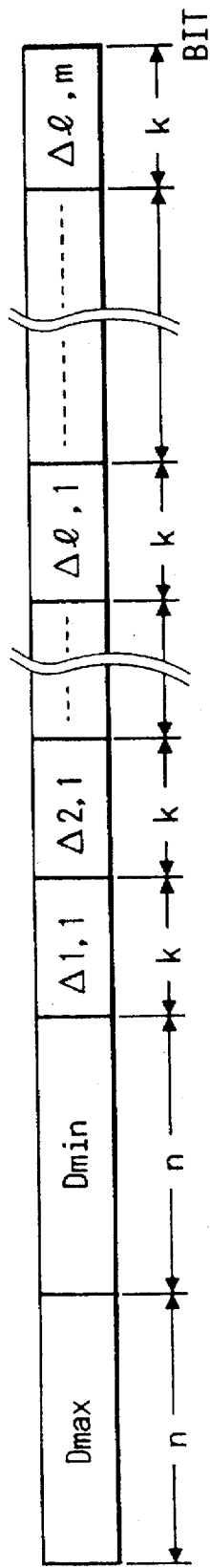
FIG. 15 is a view showing the format of the transmitted data in the information signal transmission system of the third embodiment.

The enciphering unit 403 enciphers the supplied $D_{max}$, $D_{min}$ according to the cipher key data and supplies the enciphered data to the terminal b of said switch 404, which is suitably shifted to provide serial data as shown in FIG. 15, which shows the transmitted data format corresponding to a sample block.

The data from said switch 404 is subjected to the addition of synchronization data SYNC in the parallel-serial converter 405, and are released to the transmission channel 406. The addition of the synchronization data in the parallel-serial converter 405 may be conducted in every sample block, or in plural sample blocks. The timing of operations of the above-explained circuits is controlled by a timing signal supplied from an timing controller (not shown).

Figure 16:
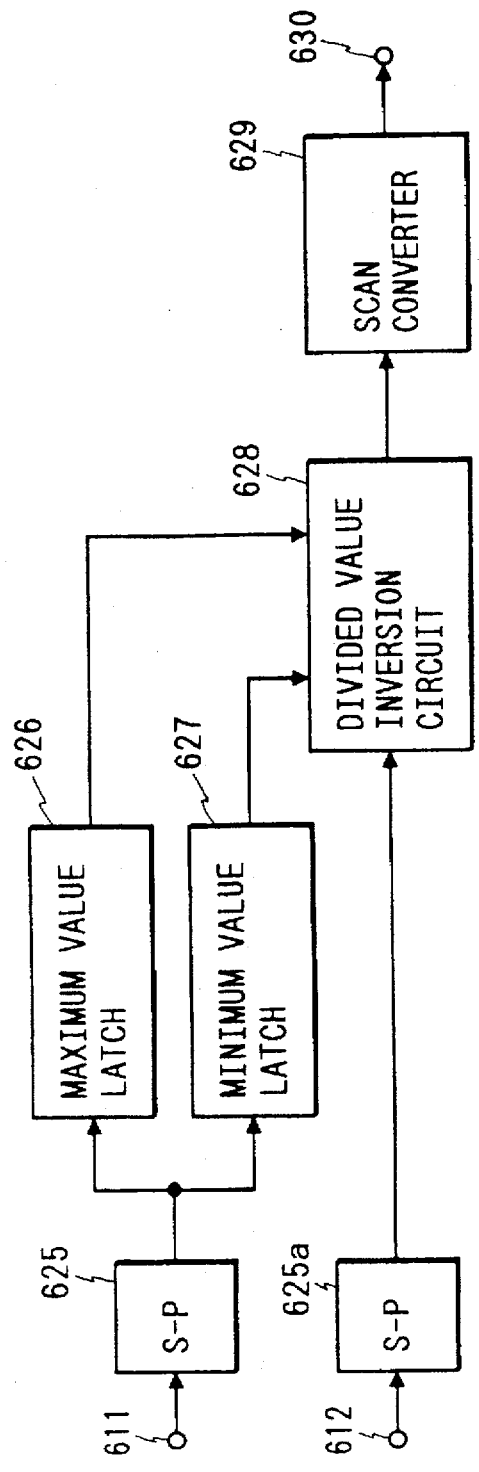
FIG. 16 is a block diagram showing, in the third embodiment of the present invention, a substitute decoder for use with the substitute compressor of FIG. 11 in the information signal transmission system shown in FIG. 7.

FIG. 16 is a block diagram showing an example of the decoder 410 shown in FIG. 7, corresponding to the compressor shown in FIG. 11. From the data transmitted through the channel 406, the synchronization data are separated by the serial-parallel converter 407 and supplied to the unshown timing controller, which determines the timing of functions of various circuits in the receiving side, based on said synchronization data.

The data supplied from said serial-parallel converter 407 are separated by the switch 408, into n-bit data $D_{max}$, $D_{min}$, and division data $\Delta_{i,j}$ obtained by k-bit digitization of the sample data between $D_{max}$ and $D_{min}$. The $D_{max}$ and $D_{min}$ are deciphered in the deciphering unit 409 according to the cipher key data and supplied through an input terminal 611 to the serial-parallel converter 625, while the division data $\Delta_{i,j}$ are supplied through an input terminal 612 to a serial-parallel converter 625a. The maximum value data $D_{max}$ and the minimum value data $D_{min}$ of each sample block, converted into parallel data by the serial-parallel converter 625, are respectively latched by latch circuits 626, 627, and supplied therefrom to a division value inverse conversion circuit 628. On the other hand, the divided data $\Delta_{i,j}$ relating to the sample data in each sample block are supplied, in the predetermined sequence explained above, to the serial-parallel converter 625a, and then to the divided value inverse conversion circuit 628.

FIG. 14B illustrates the restoration of the representative values $D'_{i,j}$ of the original sample data from the data $\Delta_{i,j}$, $D_{max}$ and $D_{min}$. As shown in FIG. 14B the respresentative value is for example selected at the middle of each digitizing level, obtained by 2k divisions of the interval between $D_{max}$ and $D_{min}$. The n-bit representative value data ($D'_{1,1} \sim D'_{m,l}$) obtained from said inverse conversion circuit 628 are supplied, in the above-mentioned sequence in each sample block, to a scan converter 629, which converts said data into a sequence corresponding to the raster scanning, and sends thus obtained decoded sample data to the D/A converter 411 through an output terminal 630.

As explained in the foregoing, in the compressed transmission of a video signal with the block encoding process, the restoration of sample points in a sample block becomes utterly impossible if the maximum value data and/or the minimum value data, constituting the initial value data, are not shown. Thus the secrecy of image transmission can be maintained by enciphering said initial value data only, according to cipher key data.

As explained in the foregoing embodiments, in the encoded data transmission, the enciphering of only the initial value data not only maintains the secrecy of the information signals but also allows one to employ a low-speed enciphering process, thereby reducing the magnitude of hardware and reducing the cost thereof.

What is claimed is:

1. An information transmission device for transmitting digital information comprising:

A) input means for inputting digital information data;
   B) data compression means for applying a data compressing process to the digital information data input from said input means, thereby forming compressed data;
   C) encrypting means for encrypting and outputting only data of a portion of the compressed data formed by said data compression means and for outputting data of the remaining portion of said compressed data without encrypting; and
   D) transmission means for transmitting the compressed data output from said encrypting means.

2. A system according to claim 1, further comprising:

A) data separation means for receiving the compressed data transmitted by said transmission means and for separating the received compressed data into encrypted compressed data and unencrypted compressed data;
   B) decrypting means for decrypting the encrypted compressed data separated by said data separation means to decode original compressed data and for outputting the decoded compressed data; and
   C) decoding means for decoding original digital information data from the decoded compressed data output from said deciphering means and the unciphered compressed data separated by said data separation means.

3. An information signal transmission device for transmitting an information signal, comprising:

A) input means for inputting a digital information data;
   B) predictive encoder means for predictive encoding the digital information data input from said input means and for outputting predictive encoded data;
   C) data output means for selectively outputting the digital information data input from said input means and the predictive encoded data output from said predictive encoder means, at a predetermined cycle;
   D) encrypting means for encrypting data of a portion of the data output from said data output means; and
   E) transmission means for transmitting the data the portion of which is encrypted by said encrypting means.

4. A device according to claim 3, wherein said encrypting means includes:

a) a data dividing circuit for dividing the data released from said data output means into the digital information data and the predictive encoded data;
   b) an encrypting circuit for encrypting the digital information data divided by said data dividing circuit; and
   c) a synthesizing circuit for synthesizing the data encrypted by said encrypting circuit and the unencrypted prediction encoded data divided by said data dividing circuit.

5. A device according to claim 4, further comprising:

A) data separation means for separating the data, transmitted by said transmission means, into the digital information data encrypted by said encrypting means and the unencrypted prediction encoded data;
   B) decrypting means for decrypting the encrypted digital information data separated by said data separating means, thereby restoring the original digital information data; and
   C) decoder means for restoring the original digital information data, utilizing the digital information data restored in said decrypting means and the unencrypted prediction encoded data separated by said data separation means.

6. A system according to claim 1, wherein said data compression means includes block encoder means for block encoding the digital information data converted by said converter means thereby outputting block encoded data.

7. An information signal transmission system for transmitting an information signal, comprising:

A) converter means for converting an analog information signal into digital information data;
   B) dynamic range data detection means for receiving digital information data converted by said converter means by a predetermined data amount, and for outputting dynamic range data representing a dynamic range of the level represented by the received data of the predetermined amount;
   C) representative value data forming means for quantizing the dynamic range of the data of said predetermined amount, determined by the dynamic range data outputted from said dynamic range data detection means, and for outputting representative value data corresponding to the levels of respective data in the data of said predetermined amount, among plural representative value data respectively representing different quantizing levels; and D) data output means for outputting, in succession, the dynamic range data released from said dynamic range data detecting means and the representative value data output from said representative data forming means.

8. A system according to claim 7, wherein said enciphering means includes:

a) a data dividing circuit for dividing the data output from said data output means into said dynamic range data and said representative value data;

b) an enciphering circuit for enciphering the dynamic range data divided by said data dividing circuit; and c) a synthesizing circuit for synthesizing the data enciphered by said enciphering circuit and the unciphered representative value data divided by said data dividing circuit.

9. A system according to claim 8, further comprising:

A) data separation means for separating the data, transmitted by said transmission means, into the dynamic range data enciphered by said enciphering means and the unciphered representative value data;

B) deciphering means for deciphering the enciphered dynamic range data separated by said data separation means, thereby restoring the original dynamic range data; and C) decoder means for restoring the original digital information data, utilizing the dynamic range data restored in said deciphering means and the unciphered representative value data separated by said data separation means.

10. An information signal transmission system for transmitting an information signal, comprising:

A) converter means for converting an analog information signal into digital information data;

B) maximum value data detection means for receiving the digital information data converted by said converter means, by a predetermined data amount, and for outputting maximum value data representing the maximum value among the received data of the predetermined amount C) minimum value data detection means for receiving the digital information data converted by said converter means, by a predetermined data amount, and for outputting minimum value data representing the minimum value among the received data of the predetermined amount, D) representative value data forming means for quantizing the dynamic range of the data of said predetermined amount, determined by the maximum value data output from said maximum value data detection means and the minimum value data output from said minimum value data detection means, and for outputting representative value data corresponding to the levels of respective data in the data of said predetermined amount, among plural representative value data respectively representing different quantization levels; and E) data output means for outputting, in succession, the maximum value data output from said maximum value data detection means, the minimum value data output from said minimum value data detection means, and the representative value data output from said representative value data forming means;

(F) enciphering means for enciphering data of a portion of the data output from said data output means; and (G) transmission means for transmitting the data the portion of which is enciphered by said enciphering means.

11. A system according to claim 10, wherein said enciphering means includes:

a) a data dividing circuit for dividing the data, output from said data output means, into said maximum value data, said minimum value data, and said representative value data;

b) an enciphering circuit for enciphering the maximum value data divided by said data dividing circuit; and c) a synthesizing circuit for synthesizing the data enciphered by said enciphering circuit, and the unciphered minimum value data and representative value data divided by said data dividing circuit.

12. A system according to claim 11, further comprising:

A) data separation means for separating the data, transmitted by said transmission means, into the maximum value data enciphered by said enciphering means, and the unciphered minimum value data and representative value data;

B) deciphering means for deciphering the enciphered maximum value data separated by said data separation means, thereby restoring the original maximum value data; and C) decoder means for restoring the original digital information data, utilizing the maximum value data restored by said deciphering means, and the unciphered minimum value data and representative values data separated by said data separation means.

13. A system according to claim 10, wherein said enciphering means includes:

a) a data dividing circuit for dividing the data, released from said data output means, into said maximum value data, said minimum value data and said representative value data;

b) an enciphering circuit for enciphering the minimum value data divided by said data dividing circuit; and c) a synthesizing circuit for synthesizing the data enciphered by said enciphering circuit, and the unciphered maximum value data and representative value data divided by said data dividing circuit.

14. A system according to claim 13, further comprising:

A) data separation means for separating the data, transmitted by said transmission means, into the minimum value data enciphered by said enciphering means, and the unciphered maximum value data and representative value data;

B) deciphering means for deciphering the enciphered minimum value data separated by said data separation means, thereby restoring the original minimum value data; and C) decoder means for restoring the original digital information data, utilizing the minimum value data restored by said deciphering means, and the unciphered maximum value data and representative value data separated by said data separation means.

15. A digital image data transmission device for transmitting digital image data, comprising:

data processing means for receiving the digital image data and encrypting a part of the digital image data to output the encrypted portion and the unencrypted portion of the digital image data, the encrypted portion of the digital image data corresponding to a major portion of the digital image data; and data transmission means for transmitting the digital information data output from said data processing means.

16. A device according to claim 15, wherein said data processing means includes data conversion means for converting the received digital image data into digital image data of n bits (n is an integer equal to or greater than 2) and outputting the converted digital information data.

17. A device according to claim 16, wherein said data processing means further includes:

data division means for receiving the digital image data output from said data conversion means on the unit basis of n bits and dividing the received digital information data into data of k bits and data of (n−k) bits;

encrypting means for encrypting said data of k bits, output from said data division means and outputting the encrypted data; and data synthesizing means for synthesizing the encrypted data output from said encrypting means and the unencrypted data of (n−k) bits, output from said data division mean and outputting the synthesized data.

18. A device according to claim 17, wherein said data division means is arranged so as to receive the digital image data output from said data conversion means on the basis of n bits, and to divide the received digital image data of n bits into upper k bits and lower (n−k) bits and output the divided bits.

19. A device according to claim 15, further comprising:

data separation means for receiving the digital image data transmitted by said data transmission means, separating the received digital information data into encrypted data and the unencrypted data and outputting the separated data;

decrypting means for decrypting the encrypted data output from said data separation means to decode original image data and outputting the decoded data; and data synthesizing means for synthesizing the data output from said decrypting means and the unencrypted data output from said data separation means and outputting the synthesized data.

20. An information transmitting method, comprising the steps of:

a) inputting digital information data;

b) compressing the input digital information data to obtain compressed data;

c) encrypting a portion of the compressed data to obtain encrypted data; and d) transmitting the remaining portion of the compressed data without encrypting and the encrypted data.

21. A method according to claim 20, wherein the digital information data is digital image data and the portion of the compressed data corresponds to a major portion of the compressed data.

22. A method according to claim 21, wherein the compressed data is obtained by compressing the digital image data in a unit of a block consisting of data corresponding to a plurality of pixels.

23. A method according to claim 22, wherein the major portion of the compressed data corresponds to a representative level of the block and the remaining portion of the compressed data corresponds to a detailed construction of the block.

24. A method according to claim 21, wherein the compressed data is obtained by compressing the digital image data using a predictive coding method.

25. A method according to claim 24, wherein the remaining portion of the compressed data includes differential data which represents a difference between an input image data and a predictive image data and the major portion of the compressed data does not include the differential data.

26. An image signal processing signal device comprising:

input means for inputting digital image data;

separation means for separating the input digital image data into a first portion and a second portion thereof;

encrypting means for encrypting the first portion of the digital image data to obtain encrypted data; and output means for outputting the second portion of the digital image data without encrypting and the encrypted data.

27. A device according to claim 26, wherein the first portion includes data roughly representing an image corresponding to the input digital image data and the second portion includes data representing the image in detail.

28. A device according to claim 27, wherein said separation means separates the input digital image data on the unit of a block consisting of data of which corresponds to a plurality of pixels.

29. An image signal processing method, comprising the steps of:

inputting digital image data;

separating the input digital image data into a first portion and a second portion thereof;

encrypting the first portion of the digital image data to obtain encrypted data; and outputting the second portion of the digital image data without encrypting and the encrypted data.

30. A method according to claim 29, wherein the first portion includes data roughly representing an image corresponding to the input digital image data and the second portion includes data representing the image in detail.

31. A method according to claim 30, wherein the input digital image data is separated into the first and second portions on the unit of a block consisting of data which corresponds to a plurality of pixels.

* * * * *

UNITED STATES PATENT AND TRADEMARK OFFICE
CERTIFICATE OF CORRECTION

PATENT NO. : 5,682,425

DATED : October 28, 1997

INVENTOR(S) : Masahiko Enari

It is certified that error appears in the above-identified patent and that said Letters Patent is hereby corrected as shown below:

Col. 3, line 50,   delete "." after "enciphering".

Col. 4, line 6,    delete "substitute a" and insert -- a substitute --.

Col. 4, line 55    delete "3bit" and insert -- 3-bit --.

Signed and Sealed this

Thirteenth Day of October 1998

*Attest:*

BRUCE LEHMAN

*Attesting Officer*        Commissioner of Patents and Trademarks